United States Patent [19]

Jiles

[11] Patent Number: 5,020,401

[45] Date of Patent: Jun. 4, 1991

[54] UNIVERSAL PLASTIC-PIPE TOOL

[76] Inventor: Stephen L. Jiles, 1513 Dogwood, Anaheim, Calif. 92801

[21] Appl. No.: 421,161

[22] Filed: Oct. 13, 1989

[51] Int. Cl.$^5$ ............................................. B23B 3/22
[52] U.S. Cl. ...................................... 82/113; 408/16; 408/713; 408/211; 408/79; 144/205
[58] Field of Search ........................ 408/204–207, 408/32 R, 113, 114, 117, 118, 713, 16, 79, 80, 82, 211; 144/205; 409/179, 178; 7/157, 163, 164; 82/113; 33/21.1, 21.3, 501.45, 501.05

[56] References Cited

U.S. PATENT DOCUMENTS

| | | | |
|---|---|---|---|
| 1,825,543 | 5/1932 | Thalmann et al. | 30/96 |
| 1,898,133 | 2/1933 | Leibe | 33/543 X |
| 2,331,987 | 10/1947 | Leatherman | 33/174 |
| 2,749,809 | 6/1956 | Anderson | 408/80 |
| 2,808,599 | 10/1957 | Kerr et al. | 408/80 |
| 2,968,822 | 1/1961 | Coblitz | 408/118 |
| 3,232,145 | 2/1966 | Wilson | 144/205 |
| 3,564,685 | 12/1968 | Bjalme et al. | 29/105 |
| 3,595,107 | 7/1971 | Dackow | 82/4 C |
| 3,603,182 | 9/1971 | Jackman | 82/113 |
| 3,613,320 | 10/1971 | Mighton | 82/113 X |
| 3,648,377 | 3/1972 | Witzke | 33/174 R |
| 3,661,472 | 5/1972 | Beauloye | 408/231 |
| 3,807,258 | 4/1974 | Bjalme | 82/4 C |
| 3,817,649 | 6/1974 | Medney | 144/205 X |
| 3,870,432 | 3/1975 | Strybel | 408/211 X |
| 3,999,452 | 12/1976 | Larsen | 408/713 X |
| 4,114,485 | 9/1978 | Coblitz et al. | 82/4 C |
| 4,257,289 | 3/1981 | Groothius | 144/205 |
| 4,586,408 | 5/1986 | Goldner | 144/205 X |
| 4,586,408 | 5/1986 | Goldner | 408/82 X |
| 4,601,222 | 7/1986 | Gill | 408/82 X |
| 4,754,551 | 7/1988 | Scott | 33/169 C |

FOREIGN PATENT DOCUMENTS 2518187 4/1975 Fed. Rep. of Germany ...... 408/211

Primary Examiner—Larry I. Schwartz
Assistant Examiner—Robert Schultz
Attorney, Agent, or Firm—Christie, Parker & Hale

[57] ABSTRACT

A universal tool for inspecting and processing plastic pipe includes a cylindrical chamfering element with a cylindrical wall and a pipe-receiving opening therein terminating in a base ring, the base ring carrying a tapered pin having an axis parallel to the axis of the cylindrical chamfering element, the wall of the chamfering element having a slot therein proximate the tapered pin and a four-edged cutting element mounted on the outer surface of the cylindrical wall and having one edge of the cutting element protruding through the slot in proximity to the tapered pin, the pipe to be chamfered being forced into contact with the cutting edge by axial pressure on the chamfering element and rotation thereof, an ovality-gage being carried by the chamfering element and being arcuatley rotatable, at the end of the arc rotation of the gage causing rotational forces to be applied to the chamfering element, i.e., the ovality-gage acting as a handle for the chamfering element. The ovality-gage may be separated from the chamfering element and utilized alone or in combination with a coupled second ovality-gage for checking the ovality of pipes of different nominal diameters. A wall thickness gage is carried by the ovality tool whether it is alone or in combination with a chamfering element or a dual ovality-gage.

9 Claims, 1 Drawing Sheet

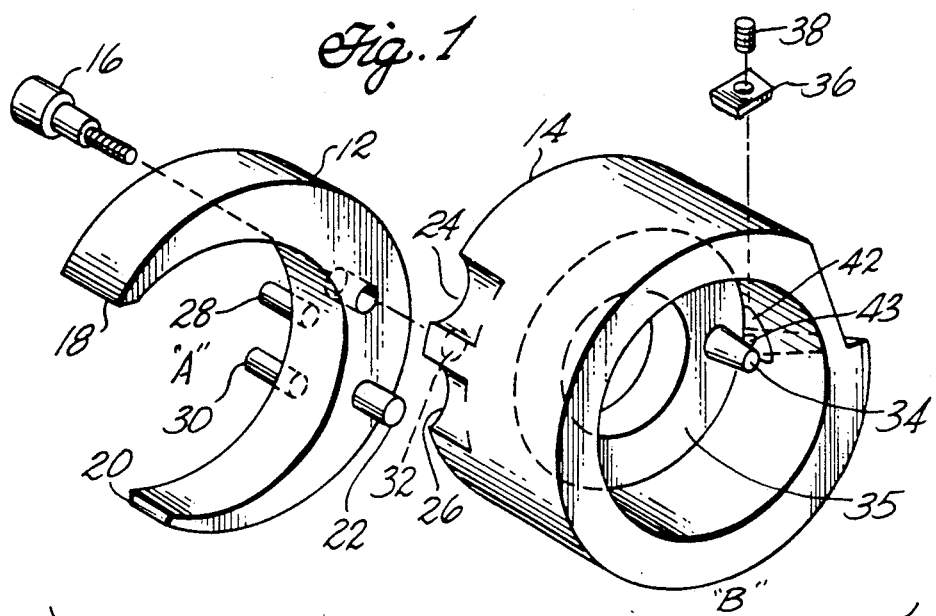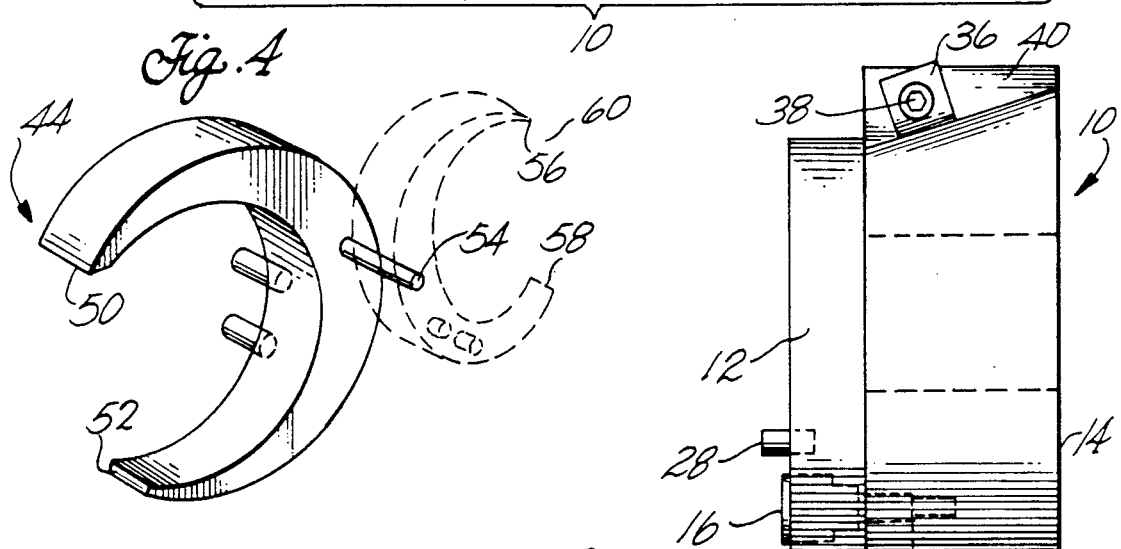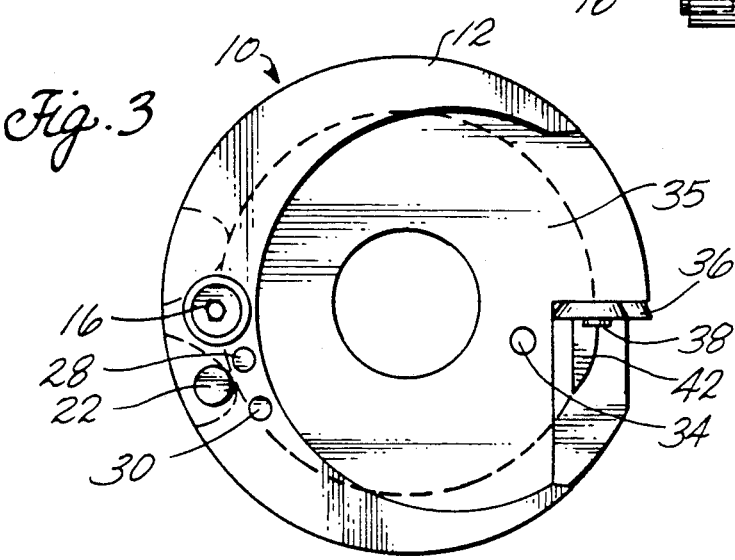

UNIVERSAL PLASTIC-PIPE TOOL

BACKGROUND OF THE INVENTION

1. Field of the Invention

This invention relates to tools for incoming inspection and installation of plastic pipe, particularly for fluid transmission.

2. Prior Art

The days of cast-iron pipe, with rigid dimensions, have passed in fluid distribution systems for utilities, such as heating gas distributors. Today, plastic pipes are universally used. They are cheaper, can be joined by simple heating techniques and deteriorate at a much slower pace than metal pipes. However, plastic pipes are much less rigid than cast-iron pipes and when wound, as they are, into large coils for transportation and storage, they tend to become oval, rather than circular, in cross-section. If the ovality of a pipe becomes excessive, it cannot be joined with another pipe in the course of installing a distribution network. Since thousands of feet of pipe may be involved in an installation, unusable pipe results in an unnecessary and unacceptable expense. Thus, the burden is shifted to the incoming inspection and quality control departments of producers and large scale users of plastic pipe. Ovality and wall thickness must be checked before the pipe is sent out into the field and at the time a joinder to another pipe is attempted in the field.

Further, with the use of electrical heating elements to couple pipes together it is necessary that the edge of the pipe be chamfered so that it slips easily inside the coupler or fitting which joins it to the next pipe.

Therefore, it is an object of this invention to provide a single tool which can be used to perform multiple functions on plastic pipes both at the receiving and storing point and in the field.

SUMMARY OF THE INVENTION

A drum-shaped chamfering element has rotatably joined to it a substantially C-shaped ovality-gage with the space between the ends of the C-shaped element set to permit a "go"-"no-go" check of pipe ovality. The extent of rotation of the the ovality-gage with respect to the chamfering element is limited so that the ovality-gage acts as a handle for rotating the chamfering element during the pipe-chamfering procedure.

The ovality-gage also carries on its external face two pins which have their opposing surfaces spaced the standard wall thickness of the pipe to be checked or used.

The chamfering element includes a four-sided, thick, carbide cutter positioned in the chamfering element to cut a chamfer at a desired angle. A tapered pin carried internally to the chamfering element is a guide for the plastic pipe. As the chamfering element is turned against the end of the pipe, the wall of the pipe is drawn between the cutter and the pin resulting in a very smooth and consistent chamfer.

BRIEF DESCRIPTION OF THE DRAWINGS

The nature and method of operation of my invention can best be understood by reading the description which follows in conjunction with the drawings herein, in which: FIG. 1 is an exploded view of my universal plastic-pipe tool;

FIG. 2 is a side-elevation view of the universal plastic-pipe tool of FIG. 1;

FIG. 3 is an end elevation view of the tool of FIG. 1; and,

FIG. 4 is an orthogonal view of ovality-gage portion of the the tool of FIG. 1.

DETAILED DESCRIPTION OF THE PREFERRED EMBODIMENT

In FIGS. 1 through 3, universal plastic-pipe tool 10 includes ovality-gage portion 12 and chamfering element 14 arcuately-rotatably secured thereto by cap screw 16. The tip portions 18, 20 of ovality-gage portion 12 are separated by the nominal outside diameter of the pipe being checked minus the tolerance set by A.S.T.M. standards.

Pin 22, in combination with recesses 24, 26, limits the arc through which ovality-gage 12 can rotate. At either of those points ovality-gage 12 can act as a handle for rotating chamfering element 14.

Pins 28, 30 on the outer face of ovality-gage 12 have their opposing surfaces spaced by a distance equal to the maximum tolerated width of the wall of a pipe to be chamfered. Before the pipe is chamfered its end to be chamfered has its wall inserted between pins 28, 30 and the pipe is rotated to assure that no part of the wall exceeds the thickness tolerance.

Threaded hole 32 receives the threaded end of screw 16 to secure ovality-gage portion 12 rotatably to chamfering portion 14. Tapered pin 34 is mounted on base ring 35, internally to chamfering element 14 with its axis parallel to the axis of chamfering element 14. Cutter 36, which may be made of tungsten carbide and has four cutting edges, is mounted by means of screw 38 to surface 40 (FIG. 2) and one edge extends through slot 42 to a position proximate to pin 34, at the approximate chamfering angle, as can be seen in FIG. 2. The chamfering angle is approximately 20 degrees and the depth of the chamfer should not exceed one-third of the wall thickness of the pipe being chamfered.

The ovality-gage portion of FIG. 1 may be provided and used separately from chamfering unit 14, as shown in FIG. 4.

In the gas distribution business the popular pipe sizes are 2" and 3" pipes. The opposing tips 50, 52 are spaced the nominal outside diameter of the pipe plus the tolerance set by the A.S.T.M. Ovality gages for two sizes of pipe, for example 2" and 3", may be coupled as shown in FIG. 4 so that the gage for the pertinent sized pipe (44 or 60) may be swung about axis 54 into position for use, while the other gage is out of the way. [If gage 44 is for 3 inch pipe and gage 60 is for 2 inch pipe, tips 56, 58 will be spaced a lesser distance than tips 50, 52.] This combination increases the versatility of the ovality gage.

While particular embodiments of my universal plastic-pipe gage have been shown and described, it will be apparent to those skilled in the art that alterations and modifications may be made therein without departing from the true scope and spirit of my invention. It is the purpose of the appended claims to cover all such alterations and modifications.

I claim:

1. A universal tool for use with plastic pipes, including:
    a cylindrical chamfer element having a base ring and
        a cylindrical wall coaxial therewith and extending therefrom, said cylindrical wall having an inner surface defining an axially-positioned pipe-receiving opening and an outer surface, the axes of said base and wall forming the axis of said chamfering element;

a ledge on the exterior of said wall extending from the outer surface of said wall toward its inner surface;

a through slot in said wall intersecting said ledge;

a tapered pin defining a longitudinal axis and mounted on said base ring proximate said slot, said pin extending from said base ring, with the longitudinal axis of said pin parallel to the axis of said chamfering element and spaced from the inner surface of said cylindrical wall by a distance approximately the thickness of the wall of a plastic pipe to be chamfered and with the longitudinal axis of said pin being spaced from the axis of said chamfering element; and a cutting element supported on said ledge and extending partially through said slot, to present a cutting edge that extends into said opening at the desired chamfering angle; whereby, upon insertion of a pipe to be chamfered into said pipe-receiving opening and rotation thereof while under axial pressure, the end of the pipe being chamfered is urged by said tapered pin into forceful engagement with said cutting edge and is chamfered by said edge.

2. A universal tool for use with plastic pipes, including:

a cylindrical chamfering element having a base ring and a cylindrical wall coaxial therewith and extending therefrom, said cylindrical wall having an inner surface defining an axially-positioned pipe-receiving opening and an outer surface, the axes of said base and wall forming the axis of said chamfering element;

a slot in said wall;

a tapered pin defining a longitudinal axis and mounted on said base ring proximate said slot, said pin extending from said base ring, with the longitudinal axis of said pin parallel to the axis of said chamfering element and spaced from the inner surface of said cylindrical wall by a distance approximately the thickness of the wall of a plastic pipe to be chamfered and with the longitudinal axis of said pin being spaced from the axis of said chamfering element; and a cutting element supported on said wall and extending partially through said slot, to present a cutting edge that extends into said opening at the desired chamfering angle; and an ovality-gage mechanically coupled to said chamfering element and rotatable through a predetermined arc at the terminus of which rotational force is applied to the chamfering element from the ovality-gage for effecting the chamfering of a plastic pipe; whereby, upon insertion of a pipe to be chamfered into said pipe-receiving opening and rotation thereof while under axial pressure, the end of the pipe being chamfered is urged by said tapered pin into forceful engagement with said cutting edge and is chamfered by said edge.

3. Apparatus according to claim 2 in which said ovality-gage has a body portion terminating in a pair of opposed tips, such opposed tips being spaced a distance approximating the nominal diameter of the pipe being processed.

4. Apparatus according to claim 2 in which said ovality-gage carries on its surface remote from said chamfering element a pair of parallel pins spaced from each other a distance approximating the nominal wall thickness of a pipe to be processed.

5. The universal tool of claim 1, wherein said cutting element has a plurality of cutting edges and may be mounted on said ledge in a plurality of positions, in each of which a different one of said cutting edges extends through said slot.

6. The universal tool of claim 1, wherein said ledge extends along the axis of said chamfering element, and wherein said ledge has a width which increases along the length of said ledge.

7. The universal tool of claim 6, wherein said ledge is wedge-shaped.

8. The universal tool of claim 7, wherein said wedge-shaped ledge has one side which is parallel to the axis of said chamfering element and a second side which is inclined to said axis.

9. The universal tool of claim 8, wherein said cutting element is oriented on said ledge with its cutting edge parallel to said inclined side of said ledge.

* * * * *